(12) United States Patent
Takenaka et al.

(10) Patent No.: US 8,499,863 B2
(45) Date of Patent: Aug. 6, 2013

(54) FRICTION DRIVE DEVICE AND OMNI-DIRECTIONAL VEHICLE USING THE SAME

(75) Inventors: Toru Takenaka, Saitama (JP); Makoto Hirano, Saitama (JP); Hideharu Izumi, Saitama (JP); Kazuya Kuwabara, Saitama (JP); Taiji Koyama, Saitama (JP); Shinichiro Kobashi, Saitama (JP); Hiroshi Gomi, Saitama (JP); Masao Sasaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 238 days.

(21) Appl. No.: 13/127,347

(22) PCT Filed: Nov. 2, 2009

(86) PCT No.: PCT/JP2009/005832
§ 371 (c)(1),
(2), (4) Date: Jun. 1, 2011

(87) PCT Pub. No.: WO2010/052890
PCT Pub. Date: May 14, 2010

(65) Prior Publication Data
US 2011/0260523 A1     Oct. 27, 2011

(30) Foreign Application Priority Data

Nov. 4, 2008 (JP) .................................. 2008-283474

(51) Int. Cl.
*B62D 57/00*    (2006.01)
(52) U.S. Cl.
USPC ............................................ 180/7.1; 180/21

(58) Field of Classification Search
USPC .......... 180/7.1, 10, 21; 301/5.1, 5.23; 305/6, 305/7
See application file for complete search history.

(56) References Cited

U.S. PATENT DOCUMENTS

| | | | |
|---|---|---|---|
| 4,076,263 A * | 2/1978 | Rand | 280/843 |
| 7,980,336 B2 * | 7/2011 | Takenaka et al. | 180/7.1 |
| 8,240,407 B2 * | 8/2012 | Takenaka et al. | 180/7.1 |
| 8,342,270 B2 * | 1/2013 | Takenaka et al. | 180/7.1 |
| 8,408,339 B2 * | 4/2013 | Makino | 180/7.1 |
| 2008/0018167 A1 * | 1/2008 | Fuji | 301/5.23 |
| 2010/0038960 A1 | 2/2010 | Takenaka et al. | |
| 2010/0096905 A1 | 4/2010 | Takenaka et al. | |

(Continued)

FOREIGN PATENT DOCUMENTS

| JP | 10-129517 A | 5/1998 |
|---|---|---|
| JP | 2001-354156 A | 12/2005 |

(Continued)

*Primary Examiner* — Anne Marie Boehler
*Assistant Examiner* — Maurice Williams
(74) *Attorney, Agent, or Firm* — Carrier Blackman & Associates, P.C.; William D. Blackman; Fulchand P. Shende

(57) ABSTRACT

In a friction drive device comprising first free rollers and second free rollers contacting each other at the outer circumferential surfaces thereof to frictionally transmit power from the second free rollers to the first free rollers, in order to minimize the slippage between the first and second free rollers, minimize the power loss and cause the first free rollers to move as designed, an outer peripheral part of each first free roller defining an outer circumferential surface thereof has a different stiffness from that of an outer peripheral part of each second free roller defining an outer circumferential surface thereof.

9 Claims, 12 Drawing Sheets

U.S. PATENT DOCUMENTS

| | | | |
|---|---|---|---|
| 2010/0139996 A1* | 6/2010 | Takenaka et al. | 180/20 |
| 2011/0067935 A1* | 3/2011 | Gomi et al. | 180/21 |
| 2011/0067936 A1* | 3/2011 | Takenaka et al. | 180/21 |
| 2011/0067937 A1* | 3/2011 | Gomi et al. | 180/21 |
| 2011/0067939 A1* | 3/2011 | Takenaka | 180/21 |
| 2011/0067940 A1* | 3/2011 | Takenaka | 180/218 |
| 2011/0070997 A1* | 3/2011 | Gomi et al. | 476/66 |
| 2011/0070998 A1* | 3/2011 | Takenaka et al. | 476/68 |
| 2011/0071714 A1* | 3/2011 | Takenaka | 701/22 |
| 2011/0071752 A1* | 3/2011 | Takenaka et al. | 701/124 |
| 2011/0233989 A1* | 9/2011 | Takenaka et al. | 301/5.23 |
| 2012/0018232 A1* | 1/2012 | Uehara | 180/7.1 |
| 2012/0061156 A1* | 3/2012 | Takenaka et al. | 180/21 |

FOREIGN PATENT DOCUMENTS

| | | |
|---|---|---|
| JP | 2005-344777 A | 12/2005 |
| JP | 3820239 B2 | 9/2006 |
| WO | 2008-132778 A1 | 11/2008 |
| WO | 2008-132779 A1 | 11/2008 |

* cited by examiner

3R(3L)

3R(3L)

FRICTION DRIVE DEVICE AND OMNI-DIRECTIONAL VEHICLE USING THE SAME

TECHNICAL FIELD

The present invention relates to a friction drive device and an omni-directional vehicle using the same, and in particular to a friction drive device that transmits power to first free rollers from second free rollers by causing each first free roller to be engaged by the corresponding second free roller at outer circumferential surfaces thereof with their rotational axes disposed in non-parallel relationship, and an omni-directional vehicle using the same.

BACKGROUND OF THE INVENTION

A friction drive device for an omni-directional vehicle that can freely move about on a floor is known, for instance, from Japanese patent No. 3820239. This device comprises a main wheel including an annular member and a plurality of driven rollers rotatably supported along the outer circumference of the annular member, and a plurality of drive rollers engaging the outer circumferential surfaces of the driven rollers at the outer circumferential surfaces thereof so that the rotation of the drive rollers may be frictionally transmitted to the driven rollers.

The applicant of this application previously proposed a friction drive device for an omni-directional vehicle that comprises a base frame, a first moveable member and a second moveable member each moveably supported by the base frame, a first drive unit and a second drive unit configured to actuate the first moveable member and second moveable member, respectively, a plurality of first free rollers arranged on the first moveable member along the direction of movement of the first moveable member, each rotatable around an axial center line thereof, and a plurality of second free rollers arranged on the second moveable member along the direction of movement of the second moveable member, each rotatable around an axial center line thereof, wherein, as at least one of the first and second moveable members moves, one of the first free rollers engages the corresponding one of the second free rollers at the outer circumferential surfaces thereof with the central axial lines thereof disposed in a non-parallel relationship so that power may be transmitted from the second free rollers to the first free rollers engaging an object to be driven. See WO2008/132778.

Furthermore, the applicant of this application previously proposed a friction drive device for an omni-directional vehicle that comprises a main wheel (first moveable member) including an annular member and a plurality of driven rollers (first free rollers) arranged circumferentially along the annular member so as to be each rotatable around the tangential line of the annular member at the position of the driven roller, a pair of rotatable members (second rotatable members) on either side of the main wheel, each rotatable around the central axial line thereof, a plurality of drive rollers (second free rollers) each mounted on each rotatable member so as to engage the outer circumferential surfaces of the corresponding driven rollers at the outer circumferential surface thereof with the axial line of each drive roller disposed in non-parallel relationship with respect to the axial line of the corresponding driven roller so that the rotation of the rotatable members may be transmitted to the main wheel via the frictional engagement between the outer circumferential surfaces of the drive rollers and outer circumferential surfaces of the driven rollers. See WO2008/132779.

BRIEF SUMMARY OF THE INVENTION

Task to be Achieved by the Invention

In such a friction drive vehicle, power is transmitted by means of the frictional engagement between the outer circumferential surfaces of the first free rollers (driven rollers) and second free rollers (drive rollers), and any slippage in the contact surface between the first free rollers and second free rollers causes an increase in power loss and reduces the efficiency of power transmission. Also, slippage between the first free rollers and second free rollers prevents the movement of the second free rollers to be accurately transmitted to the first free rollers, and hence prevents the first free rollers to move as designed. Therefore, if there is any slippage in the friction drive device, the omni-directional vehicle powered by the friction drive device is unable to travel as designed, and this prevents the vehicle from performing as intended.

Therefore, in such a friction drive device, to minimize power loss, and cause the first free rollers to move as designed, it is necessary to minimize the slippage in the contact between the outer circumferential surfaces of the first free rollers and second free rollers.

In view of such problems of the prior art, a primary object of the present invention is to provide a frictional drive device that can minimize the slippage between the first free rollers and second free rollers so that the power loss may be minimized, and the first free rollers may be caused to move as designed.

Means to Achieve the Task

The friction drive device of the present invention comprises a base frame; a first moveable member and a second moveable member each moveably supported by the base frame; a set of a plurality of first free rollers arranged on the first moveable member along a direction of movement of the first moveable member so as to be individually rotatable around a central axial line thereof; and a set of a plurality of second free rollers arranged on the second moveable member along a direction of movement of the second moveable member so as to be individually rotatable around a central axial line thereof; wherein each first free roller engages a corresponding one of the second free rollers at outer circumferential surfaces thereof with the central axial lines thereof in a non-parallel relationship as at least one of the first and second moveable members move so as to frictionally transmit power from the second free rollers to the first free rollers, the first free rollers being configured to engage an object to be driven, characterized by that: an outer peripheral part of each first free roller defining an outer circumferential surface thereof has a different stiffness from that of an outer peripheral part of each second free roller defining an outer circumferential surface thereof.

According to this friction drive device, in the area where the outer circumferential surfaces of the first and second free rollers contact each other, the peripheral part of each free roller having a relatively low stiffness is caused to undergo an elastic deformation by the peripheral part of each free roller having a relatively high stiffness so that the contact between the outer circumferential surfaces of the first and second free rollers occurs over a large area. This increase in the contact area reduces the slippage between the first free rollers and second free rollers.

The difference in the stiffness between the peripheral parts of the first free rollers and second free rollers may be achieved by the difference in the Young's modulus or stiffness of the materials of the peripheral parts of the drive rollers and driven rollers, and/or by the difference in the structures of the peripheral parts of the first free rollers and second free rollers.

In the friction drive device of the present invention, preferably, the outer circumferential surface of each free roller of at least one of the two sets of first and second free rollers having a higher stiffness is formed as an irregular surface.

According to this aspect of the friction drive device of the present invention, the peripheral part of each free roller having a relatively low stiffness is engaged by the irregular surface feature of the peripheral part of the corresponding free roller having a relatively high stiffness so that the slippage between the first and second free rollers can be reduced even further.

According to another aspect of the present invention, the outer peripheral part of each free roller of one of the two sets of first and second free rollers having a lower stiffness is made of rubber-like elastomeric material.

According to this aspect of the friction drive device of the present invention, in the area where the outer circumferential surfaces of the first free rollers and second free rollers contact each other, the peripheral part of each free roller having a relatively lower stiffness is allowed to undergo a favorable elastic deformation owing to the elastic property of the rubber-like elastomeric material, and the rubber-like elastomeric material also increases the frictional resistance so that the slippage between the first and second free rollers can be reduced even further.

According to yet another aspect of the present invention, the central axial line of each first free roller is in a skewed relationship with the central axial line of the second free roller engaged by the particular first free roller.

According to a preferred embodiment of the present invention, the first moveable member comprises a main wheel including an annular member configured to be rotatable around a central axial line thereof, and the second moveable member comprises a rotatable member configured to be rotatable around a central axial line thereof, the first free rollers being fitted on the annular member each rotatable around the central axial line thereof, the second free rollers being arranged on the rotatable member around the central axial line thereof.

According to another preferred embodiment of the present invention, the first and second moveable members comprise a first endless belt and a second endless belt, respectively, each passed around a pair of rollers at an angle with respect to the other endless belt, and the first free rollers and second free rollers are provided on the first and second endless belts, respectively.

According to yet another preferred embodiment of the present invention, the first and second moveable members comprise a first annular member and a second annular member, respectively, having a common central rotational axial line, and the first free rollers and second free rollers are provided on the first and second annular members, respectively.

The omni-directional vehicle of the present invention comprises a friction drive device as defined above, and may be configured to travel by the first free rollers engaging a road or floor surface, or may further comprise a rollable ball that are actuated by the first free rollers so that the vehicle may be enabled to travel by the ball engaging a road or floor surface.

Effect of the Invention

According to the friction drive device of the present invention, in the area where the outer circumferential surfaces of the first and second free rollers contact each other, the peripheral part of each free roller having a relatively low stiffness is caused to undergo an elastic deformation by the peripheral part of each free roller having a relatively high stiffness so that the contact between the outer circumferential surfaces of the first and second free rollers occurs over a large area. This increase in the contact area improves the efficiency of the frictional transmission of the propelling force, and reduces the slippage between the drive rollers and driven rollers.

DETAILED DESCRIPTION OF THE PREFERRED EMBODIMENT(S)

Figure 1:
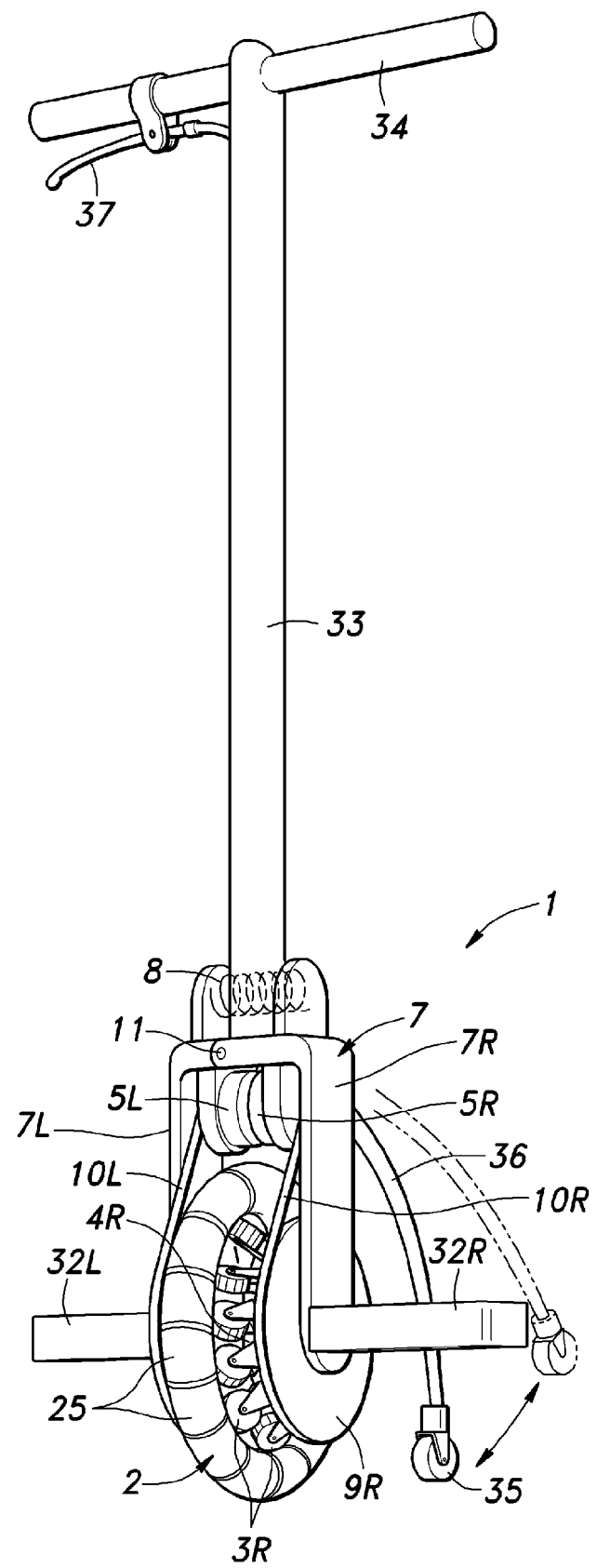
FIG. 1 is a perspective view of a friction drive device and an omni-directional vehicle using the same as given as a first embodiment of the present invention.
Figure 2:
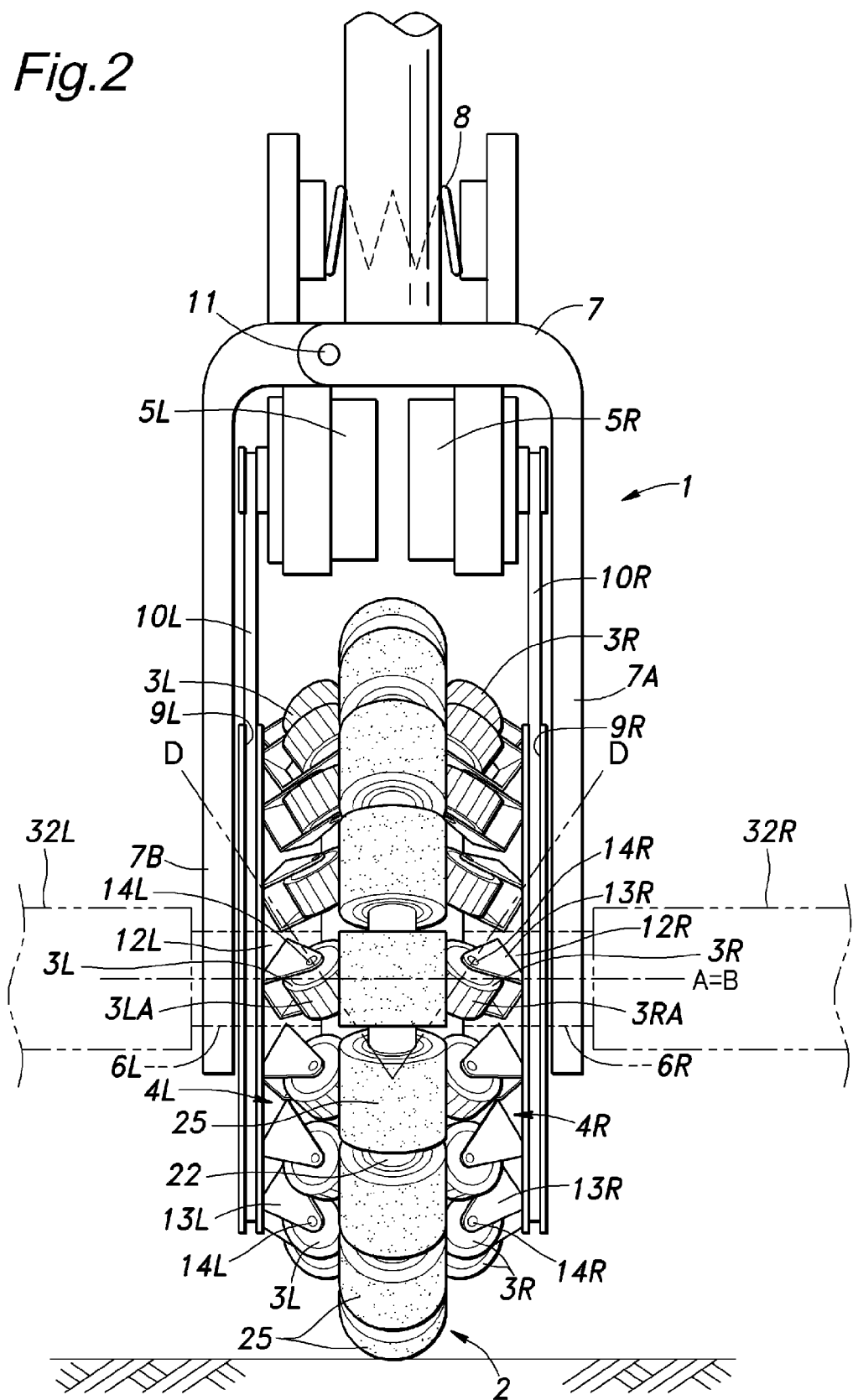
FIG. 2 is an enlarged front view of the friction drive device and omni-directional vehicle using the same of the first embodiment.
Figure 3:
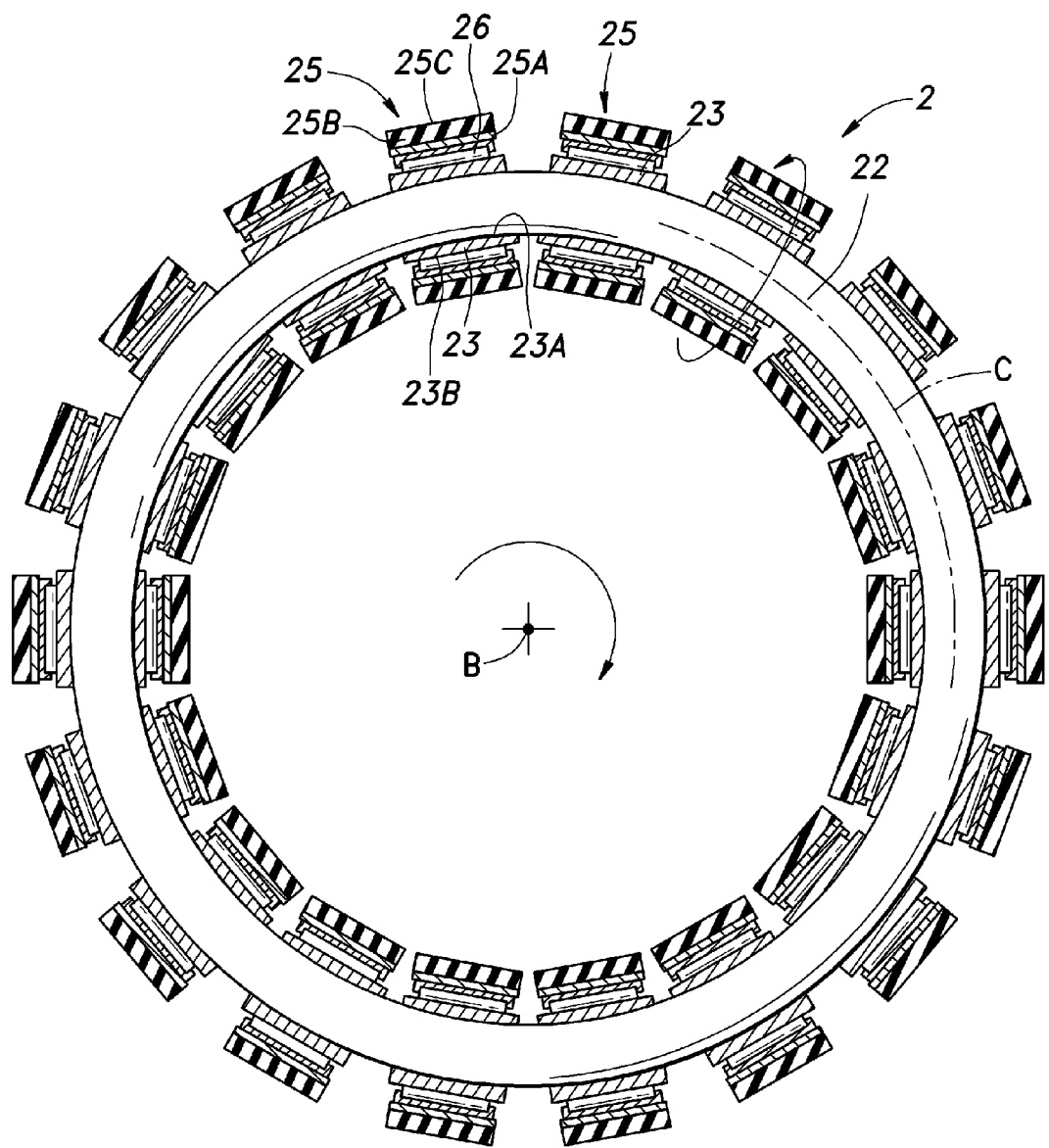
FIG. 3 is an enlarged sectional view of a main wheel used in the friction drive device of the first embodiment.

Referring to FIGS. 1 to 3, a friction drive device embodying the present invention and an omni-directional vehicle 1 using the same are described in the following.

The omni-directional vehicle 1 of the illustrated embodiment comprises a lower vehicle body 7 of a yoke configuration that supports, although in an indirect manner, a main wheel (road wheel) serving as a first moveable member in a rotatable manner.

The lower vehicle body 7 includes a pair of leg members 7R and 7L that are hinged to each other via a hinge pin 11. Each leg member 7R, 7L is provided with a step 32R, 32L extending substantially in the horizontal direction. To the left leg member 7L is affixed a lower end of a pole 33 which extends vertically upward and provided with a horizontally extending handle bar 34 at the upper end thereof. A compression coil spring 8 is interposed between the right and left leg members 7R and 7L of the lower vehicle body 7 so that the two leg members 7R and 7L are resiliently urged toward each other.

The lower vehicle body 7, two steps 32R and 32L, pole 33 and handle bar 34 are integrally joined to each other, and jointly form a vehicle body of the omni-directional vehicle 1.

The lower vehicle body 7 is fitted with an auxiliary wheel 35 via an arm 36 having an upper end pivotally supported by a rear part of the of the lower vehicle body 7 so as to be raised and lowered as required. The auxiliary wheel 35 is supported by the free end (lower end) of the arm 36 so as to be located behind the main wheel 2 and rotatable around a horizontal axial line. The handle bar 34 is provided with a grip lever 37 that is connected to the arm 36 via a per se known Bowden cable (not shown in the drawings) so that the arm 36 may be raised by squeezing the grip lever 37 by hand.

A right rotatable member (second moveable member) 4R is rotatably supported by the right leg member 7R via a support shaft 6R, and a left rotatable member (second moveable member) 4L is rotatably supported by the left leg member 7L via a support shaft 6L so that the right and left rotatable members 4R and 4L are supported by the vehicle body 7 so as to be rotatable around a common central axial line (A) in an axially spaced apart relationship.

Each rotatable member 4R, 4L is integrally and coaxially provided with a pulley (or sprocket) 9R, 9L. Each leg member 7R, 7L is provided with an electric motor 5R, 5L in such a manner that each rotatable member 4R, 4L is rotatively actuated around the central axial line (A) of the support shaft 6R, 6L by drivingly connecting the output end of the corresponding electric motor 5R, 5L with the corresponding pulley 9R, 9L via an endless belt (or link chain) 10R, 10L. Thereby, the two rotatable members 4R, 4L can be individually actuated by the corresponding electric motors 5R and 5L.

The vehicle body 7 and/or the pole 33 are incorporated with a rechargeable battery for powering the electric motors 5R and 5L and a control unit not shown in Each rotatable member 4R, 4L is formed with a frusto-conical tapered outer circumferential surface 12R, 12L opposing the other rotatable member. To the frusto-conical tapered outer circumferential surface 12R of the right rotatable member 4R are mounted a plurality of drive rollers (second free rollers) 3R which are arranged circumferentially or along the direction of the movement of the right rotatable member 4R, each via a bracket 13R and a pivot pin 14R, at a regular angular interval. To the frusto-conical tapered outer circumferential surface 12L of the left rotatable member 4L are mounted a plurality of drive rollers (second free rollers) 3L which are arranged circumferentially or along the direction of the movement of the left rotatable member 4L, each via a bracket 13L and a pivot pin 14L, at a regular angular interval.

The main wheel 2 is located between the right and left rotatable members 4R and 4L, and is rotatably supported around a central axial line (B) coaxial with the central axial line (A) of the right and left rotatable members 4R and 4L by being interposed between the right drive rollers 3R of the right rotatable member 4R and left drive rollers 3L of the left rotatable member 4L.

Each drive roller 3R, 3L including the outer peripheral part defining an outer circumferential surface 3RA, 3LA is generally made of a material, such as aluminum, stainless steel and hard plastic material, having a higher Young's modulus, higher stiffness and higher stiffness as compared with elastomeric rubber material.

The main wheel 2 comprises an annular member 22 and a plurality of driven rollers (first free rollers) 25 rotatably supported thereby so as to be rotatable around an axial line tangential to the corresponding point of the annular member 22. The driven rollers 25 are thus arranged along the direction of movement of the main wheel 2 (annular member 22) or around the central axial line of the main wheel 2.

More specifically, as illustrated in FIG. 3, the annular member 22 comprises a metallic solid annular ring, and a plurality of inner sleeves 23 arranged circumferentially thereof at a regular angular interval. Each inner sleeve 23 is provided with a slightly curved inner bore 23A conforming to the corresponding outer profile of the annular member 22 and fixedly (both rotationally and circumferentially) fitted on the annular member 22. The outer circumferential surface 23B of each inner sleeve 23 defines a true cylindrical surface. The annular member 22 may also consist of a polygonal ring or a ring consisting of a plurality of segments.

Each driven roller 25 comprises a metallic cylindrical inner sleeve 25A and a cylindrical outer peripheral member 25B fixedly fitted on the inner sleeve 25A and defining an outer circumferential surface 25C of the driven roller 25. Each driven roller 25 is rotatably fitted on the outer circumferential surface 23B of the corresponding inner sleeve 23 via a needle bearing 26.

The outer peripheral member 25B of each driven roller 25 is generally made of a material, such as urethane or other rubber material and elastomeric material, having a lower Young's modulus, lower stiffness and lower stiffness as compared with metallic and hard plastic materials.

Therefore, the outer peripheral part of each drive roller 3R, 3L defining the outer circumferential surface 3RA, 3LA thereof differs in stiffness from the outer peripheral member 25B of each driven roller 25 defining the outer circumferential surface 25C thereof. In the illustrated embodiment, the stiffness of the outer peripheral part of each drive roller 3R, 3L defining the outer circumferential surface 3RA, 3LA thereof is higher than that of the outer peripheral member 25B of each driven roller 25 defining the outer circumferential surface 25C thereof.

The outer circumferential surface 3RA, 3RL of each drive roller 3R, 3L engages the outer circumferential surface 25C of the corresponding driven roller 25 under the biasing force of the compression coil spring 8, and power is frictionally transmitted from the drive rollers 3R and 3L to the driven rollers 25. In other words, the outer circumferential surface 3RA, 3RL of each drive roller 3R, 3L engages the outer circumferential surface 25C of the corresponding driven roller 25 in a torque transmitting relationship so that the rotation of the rotative members 4R and 4L is transmitted to the main wheel 2.

Each driven roller 25 consists of a freely rotatable roller engaging an object to which a drive force is to be transmitted or applied, and is fitted around the annular member 22 like beads of a rosary. More specifically, each driven roller 25 is rotatable around a tangential direction of the annular member 46 or an axial center line (rotational center line) of the particular drive roller 25. The number of the drive rollers 3R, 3L on each side in relation with the number of the driven rollers 25 is selected in such a manner that the driven roller 25 engaging the floor surface or road surface is engaged by at least one of the drive rollers 3R, 3L, and thereby receives a drive force at all times.

Each of the drive rollers 3R and 3L is supported so as to be rotatable around a central axial line (D) which is neither perpendicular or parallel to the rotational direction of the main wheel 2 around the central axial line (B) (which is the same as the central axial line (A) of the rotatable members 4R and 4) or, more accurately, the tangential direction of the circle centered around the central axial line at the point corresponding to the position. In other words, each of the drive roller 3R, 3L has a central axial line (D) which is tilted with respect to the rotational direction of the main wheel 2 around the central axial line (B), and is in a skewed relationship to the central axial line (A) of each rotatable member 4R, 4L. Therefore, the central axial line of each drive roller 3R, 3L is in a skewed relationship to the central axial line of the driven roller 25 which the particular drive roller 3R, 3L engages.

When seen in a projected plane perpendicular to the central axial line (A), the central axial line of each drive roller 3R, 3L tilts by a certain angle with respect to the central axial line of the corresponding driven roller 25. The central axial line of each drive roller 3R, 3L tilts with respect to the radial line of the annular member 22 corresponding to the center of the corresponding driven roller, and, at the same time, tilts with respect to an imaginary plane tangential to the central line of the annular member 22. This three dimensional tilting of the two axial lines is similar to the tilting of the teeth of a pair of helical gears meshing with each other.

Owing to this geometrical relationship, the right and left drive rollers 3R and 3L transmit the rotation of the rotatable members 4R and 4L as a side force to the driven rollers 25 via the frictional engagement between the outer circumferential surfaces of the drive rollers 3R and 3L and driven rollers 25.

When the rotatable members 4R and 4L rotate in the same direction at the same rotational speed powered by the corresponding electric motors 5R and 5L, the drive rollers 3R and 3L turn around the central axial line (A) of the rotatable members 4R and 4L without each drive roller 3R, 3L rotating around the central axial line thereof, and the resulting side force of each drive roller 3R, 3L includes a component that actuates each driven roller 25 of the main wheel 2 along the central axial line thereof (tangential direction). Thereby, the main wheel 2 rotates around the central axial line (B) without each driven wheel 25 rotating around the axial center line thereof.

If he rotatable members 4R and 4L are made to rotate in opposite directions and/or at different speeds powered by the corresponding electric motors 5R and 5L, the drive rollers 3R and 3L turn around the central axial line (A) of the rotatable members 4R and 4L while each drive roller 3R, 3L rotates around the central axial line thereof, and the resulting side force of each drive roller 3R, 3L includes a component that actuates each driven roller 25 of the main wheel 2 along the outer circumference of the driven roller 25 or around the axial center line thereof. Thereby, the driven roller 25 rotates around the central line (C) or tangential line.

The rotation of each driven roller 25 around the central axial line (C) thereof or the tangential line depends on the difference between the rotational speeds of the two rotatable members 4R and 4L. For instance, when the two rotatable members 4R and 4L are rotated at the same speed in the opposite directions, the wheel 2 does not rotate around the central axial line (B) while each driven roller 25 is rotated around the central axial line (C) thereof. Thereby, the main wheel 2 is actuated in the direction of the central axial line (B) thereof or receives a lateral drive force, and is propelled in the lateral direction.

In this manner, by individually controlling the rotational speeds and rotational directions of the rotatable members 4R and 4L via the two electric motors 5R and 5L, the omni-directional vehicle 1 can be propelled on the road surface in any desired direction.

When the driven rollers 25 of the main wheel 2 are rotated around the respective central axial lines (C) by appropriately driving the electric motors 5R and 5L while the auxiliary wheel 35 is caused to engage the road surface, as the auxiliary wheel 35 produces a lateral side force (in the direction of the central axial line (B) of the main wheel 2), and restricts the movement thereof, the main wheel 2 receives a yaw moment around a vertical yaw axis, and is caused to turn around this yaw axis. In other words, by producing a frictional force at an angle to the line connecting the ground contact point of the main wheel 2 and the ground contact point of the auxiliary wheel 35, a yaw moment around the yaw axis can be created. Thereby, the omni-directional vehicle 1 is enabled to make a turn with a relatively small turning radius.

In this omni-directional vehicle 1, it is preferable to cause the main wheel 2 which is responsible for the movement of the omni-directional vehicle 1 to move as designed, and minimize the slippage between the drive rollers 3R and 3L and the driven rollers 25 of the main wheel 2 for the purpose of minimizing the power loss.

To achieve this goal, in the illustrated embodiment, as the outer peripheral part of each drive roller 3R, 3L defining the outer circumferential surface 3RA, 3LA thereof is made of metallic or hard plastic material while the outer peripheral member 25B of each driven roller 25 defining an outer circumferential surface 25C thereof is made of urethane rubber or other rubber or elastomeric material, and hence the outer peripheral part of each drive roller 3R, 3L defining the outer circumferential surface 3RA, 3LA thereof is stiffer than the outer peripheral member 25B of each driven roller 25 defining an outer circumferential surface 25C thereof, the outer peripheral part of the driven roller 25 undergoes an elastic deformation by being engaged by the outer peripheral part of the drive roller 3R, 3L which is stiffer than the former at the area of mutual contact, and the engagement between the two sets of rollers is effected over a large contact area.

Thereby, the efficiency of the frictional power transmission between the two sets of rollers is improved on account of the reduced slippage between them so that the main wheel 2 is enabled to move as designed, and the slippage between the drive rollers 3R and 3L and the driven rollers 25 of the main wheel 2 is minimized. Thus, the omni-directional vehicle 1 is enabled to travel in a desired direction in an economical manner.

As the stiffness of each drive roller 3R, 3L is higher than that of the circumferential part of each driven roller 25 defining the outer circumferential surface thereof, or each drive roller is made of metallic or hard plastic material, the elastic deformation of each drive roller 3R, 3L applying a drive force is smaller than that of each driven roller 25 made of rubber or elastomeric material. Therefore, the elastic deformation of each drive roller 3R, 3L can be virtually reduced to zero, and the fluctuation in the transmission of propelling force can be minimized.

Alternatively, the stiffness of the peripheral part of each driven wheel 25 defining the outer circumferential surface thereof may be made higher than that of each drive roller 3R, 3L, as opposed to the illustrated embodiment where the stiffness of the peripheral part of each drive roller 3R, 3L is higher than that of each driven wheel 25 defining the outer circumferential surface thereof. According to the present invention, it suffices if the stiffness of the peripheral part of each driven wheel 25 defining the outer circumferential surface thereof is different from that of each drive roller 3R, 3L.

Figure 4:
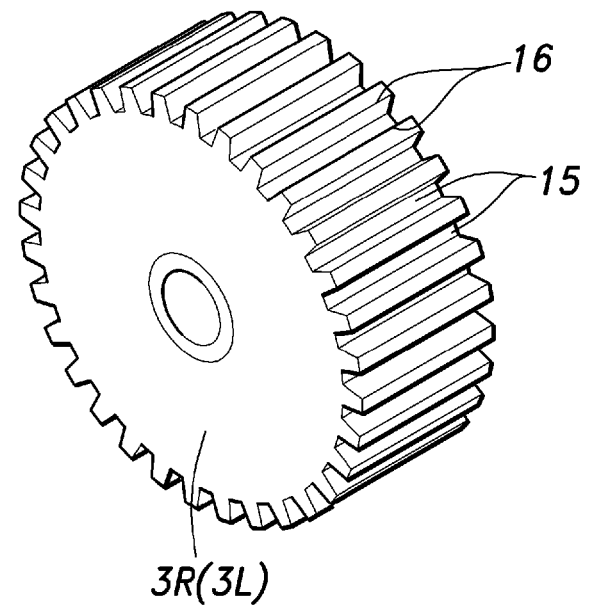
FIG. 4 is a perspective view of a drive roller used in the friction drive device of the first embodiment.

In the illustrated embodiment, each of the free rollers having a relatively stiff outer peripheral part (each drive roller 3R, 3L in the case of the illustrated embodiment) is formed with a plurality of axially extending grooves 15 arranged along the outer circumference thereof, like a spur gear, as illustrated in FIG. 4. In other words, the outer circumferential surface of each drive roller 3R, 3L is given with an irregular shape that is repeated along the outer circumference thereof.

In this case, the outer circumferential surface 25C of each driven roller having a lower stiffness is caused to fit into the grooves 15 of each drive roller 3R, 3L owing to the elastic deformation thereof so that the slippage between the drive rollers 3R and 3L and driven rollers can be further reduced.

As this engagement between each drive roller 3R, 3L and the corresponding driven roller 25 occurs primarily at the corners 16 defined along each groove 15 thereof owing to the elastic deformation of the driven roller 25, the cross sectional shape of each groove 15 is preferably rectangular so that a pair of corners each defining an angle of approximately 90 degrees are formed along either side of the groove 15. As the optimum configuration of each groove 15 may depend on the stiffness of the outer peripheral part of each driven roller 25 defining the outer circumferential surface 25C thereof, the cross sectional shape of each groove 15 may not be rectangular, but a spline or serration defining grooves of any configuration may be formed on the outer circumferential surface of each drive roller 3R, 3L. Also, the outer circumferential surface of each drive roller 3R, 3L may be formed with a grid array of grooves forming any desired angle, instead of the simple grooves 15.

Figure 5:
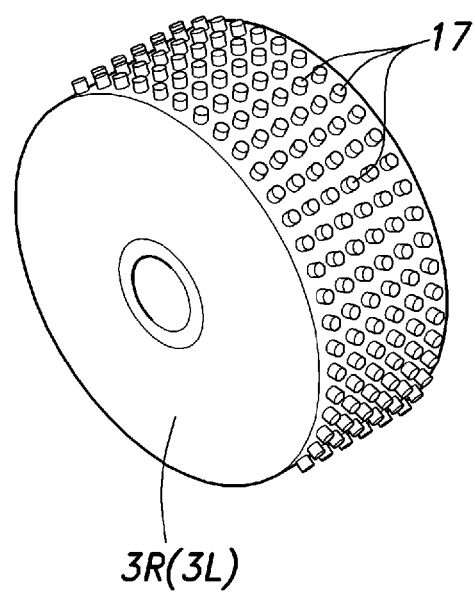
FIG. 5 is a perspective view showing a modified embodiment of the drive roller used in the friction drive device of the first embodiment.

Alternatively, the outer circumferential surface of each drive roller 3R, 3L may be formed with a grid, checkered or irregular array of dimples or projections each shaped semi-spherically, cylindrically, or polygonally. FIG. 5 shows an embodiment where the outer circumferential surface of each drive roller 3R, 3L is formed with a grid array of cylindrical projections 17.

Figure 6:
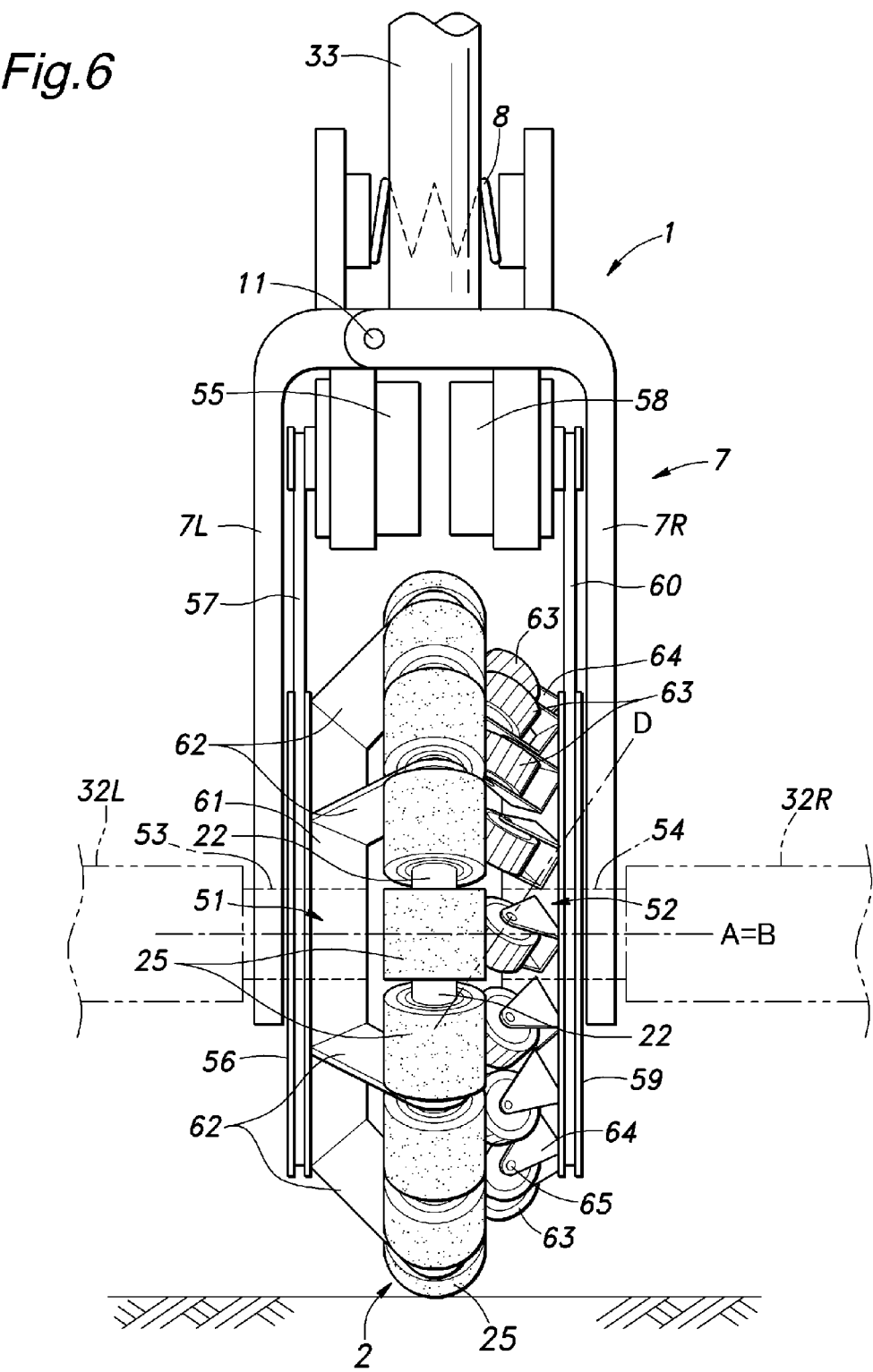
FIG. 6 is an enlarged front view of a friction drive device and an omni-directional vehicle using the same as given as a second embodiment of the present invention.

A second embodiment of the friction drive device and the omni-directional vehicle using the same of the present invention are described in the following with reference to FIG. 6. In FIG. 6, the parts corresponding to those in FIG. 2 are denoted with like numerals without repeating the description of such parts.

In this embodiment, a pair of frusto-conically shaped rotatable members 51 and 52 are supported by the left member 7L and right member 7R, respectively, via support shafts 53 and 54 so as to be rotatable around a common axial center line (A).

An electric motor 55 is mounted on the left member 7L of the lower vehicle body 7, and a pulley (or a sprocket) 56 is coaxially formed in the rotatable member 51. The output end of the electric motor 55 is drivingly coupled with the pulley 56 via an endless belt (or link chain) 57 so as to rotatably actuate the rotatable member 51 around the central axial line (A) of the support shaft 53.

Likewise, an electric motor 58 is mounted on the right member 7R of the lower vehicle body 7, and a pulley (or a sprocket) 59 is coaxially formed in the rotatable member (second moveable member) 52. The output end of the electric motor 58 is drivingly coupled with the pulley 59 via an endless belt (or link chain) 60 so as to rotatably actuate the rotatable member 52 around the central axial line (A) of the support shaft 54.

The rotatable member 51 is provided with a plurality of arms 62 each extending from a tapered outer peripheral surface 61 toward the other rotatable member 52 (or to the right as seen in FIG. 6), and fixedly supports an annular member 22. The annular member 22 forms a main wheel 2 jointly with a plurality of driven rollers 25 in a similar manner as the main wheel 2 of the first embodiment. Thereby, the main wheel 2 along with the rotatable member 51 is supported by the lower vehicle body 7 so as to be rotatable around the central axial line (A). In other words, the lower vehicle body 7 supports the main wheel 2 via the rotatable member 51 so as to be rotatable around the central axial line (A).

A plurality of drive rollers 63 are arranged circumferentially at a regular interval on the tapered outer circumferential surface 61 of the rotatable member (second moveable member) 52, or along the direction of the movement of the rotatable member 52 at a regular interval). Each drive roller 63 is rotatably supported, via a pivot pin 65, by a bracket 64 which is fixedly secured to the rotatable member 52.

As the spring force of the compression coil spring 8 resiliently urges the left member 7L and right member 7R toward each other, each drive roller 63 is pushed against the outer circumferential surface of the corresponding driven roller 25 in a torque transmitting relationship. The central axial line (D) of each drive roller 63 is in a skewed relationship to the central axial line (C) of the corresponding driven roller 25. In other words, the rotational center line of each drive roller 63 is in a skewed relationship to the rotational center line of the corresponding driven roller 25.

When seen in a projected plane perpendicular to the central axial line (A), the central axial line of each drive roller 63 tilts by a certain angle with respect to the central axial line of the corresponding driven roller 25. The central axial line of each drive roller 63 tilts not only with respect to the radial line of the annular member 22 corresponding to the central axis line of the corresponding driven roller, but also with respect to an imaginary plane tangential to the central line of the annular member 22. This three dimensional tilting of two axial lines is similar to the tilting of the teeth of a pair of helical gears meshing with each other.

Owing to this geometrical relationship, when the rotatable members 51 and 52 are rotated relative to each other, in the contact point between the driven rollers 25 and drive rollers 63 produced a frictional force (side force) which acts upon each driven roller 25 in both around the central axial line thereof and along the axial line thereof (along the generatrix line thereof).

Thus, when the rotatable members 51 and 52 rotate in the same direction at the same rotational speed powered by the corresponding electric motors 55 and 58, the drive rollers 63 turn around the central axial line (A) without each drive roller 63 rotating around the central axial line thereof, and the resulting side force of each drive roller 63 includes a component that actuates each driven roller 25 of the main wheel 2 along the central axial line thereof (tangential direction). Thereby, the main wheel 2 rotates around the central axial line (B) without each driven wheel 25 rotating around the axial center line thereof.

If the rotatable members 51 and 52 are made to rotate in opposite directions and/or at different speeds powered by the corresponding electric motors 55 and 58, the drive rollers 63 turn around the central axial line (A) while each drive roller 63 rotates around the central axial line thereof, and the resulting side force of each drive roller 63 includes a component that actuates each driven roller 25 of the main wheel 2 around the axial center line of the main wheel 2. Thereby, the driven roller 25 rotates around the central line (C) or tangential line.

In this manner, by individually controlling the rotational speeds and rotational directions of the rotatable members 51 and 52 via the two electric motors 55 and 58, the omni-directional vehicle 1 can be propelled on the road surface in any desired direction.

In this embodiment also, the number of drive rollers 63 in relation with the number of the driven rollers 25 is selected in such a manner that the driven roller 25 engaging the floor surface or road surface is engaged by at least one of the drive rollers 63, and thereby receives a drive force at all times.

In this embodiment, whereas each drive roller 63 is made of metallic or hard plastic material, the outer peripheral part of each driven roller 25 defining the outer circumferential surface thereof is made of elastomeric material such as urethane rubber and other rubber-like polymers. In other words, each drive roller 63 is stiffer than the outer peripheral part of each driven roller 25 defining the outer circumferential surface thereof.

Thus, each drive roller 63 engages the corresponding driven roller 25 at the outer circumferential surfaces thereof in such a manner that the outer peripheral part of the driven roller 25 undergoes an elastic deformation by being engaged by the outer peripheral part of the drive roller 63 which is stiffer than the former at the area of mutual contact, and the engagement between the two sets of rollers is effected over a large contact area.

Thereby, the efficiency of the frictional power transmission between the two sets of rollers is improved on account of the reduced slippage between them so that the main wheel 2 is enabled to move as designed, and the power loss is minimized. Thus, the omni-directional vehicle 1 is enabled to travel in a desired direction in an economical manner.

Figure 7:
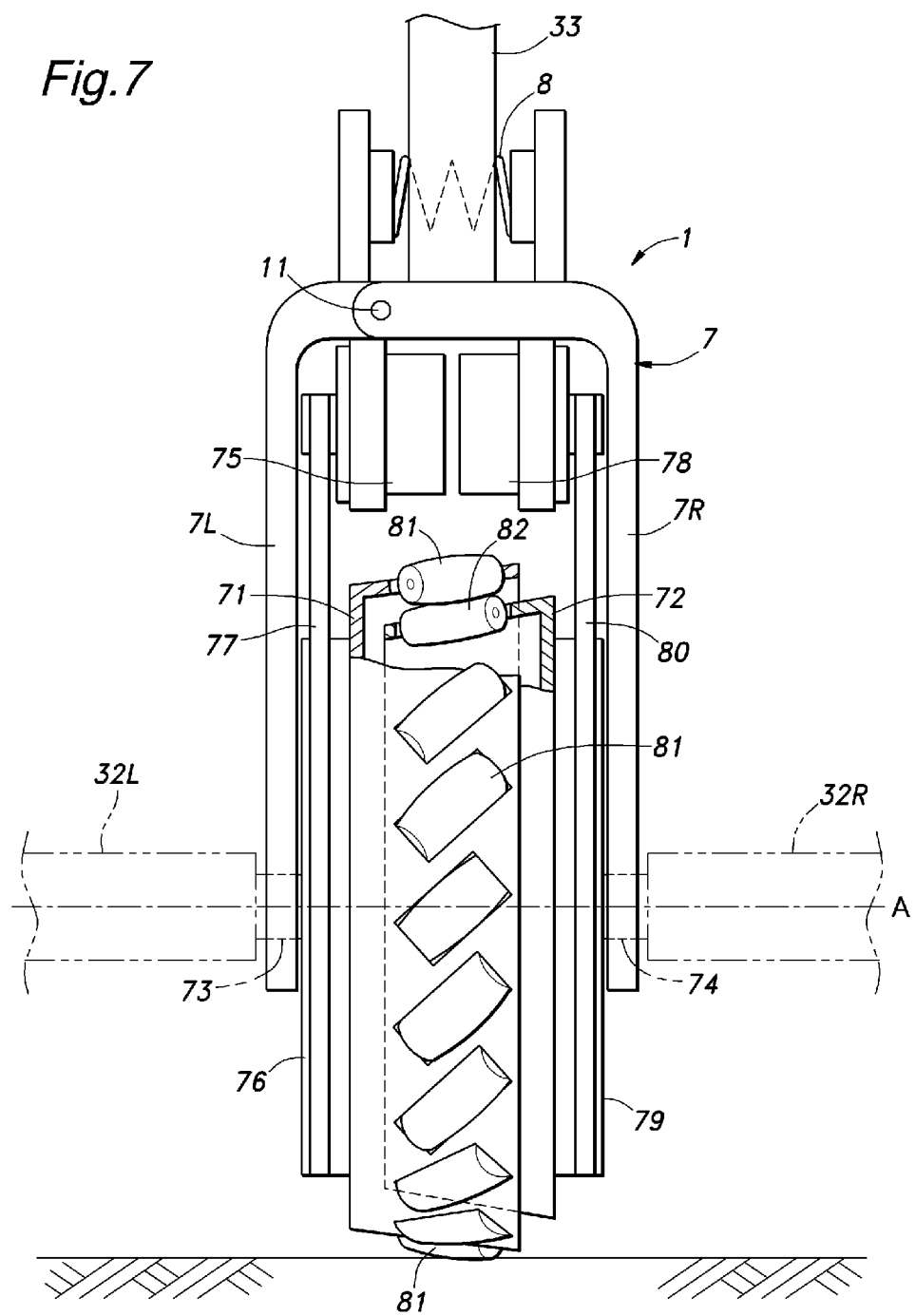
FIG. 7 is an enlarged front view of the friction drive device and omni-directional vehicle using the same of a third embodiment of the present invention.
Figure 8:
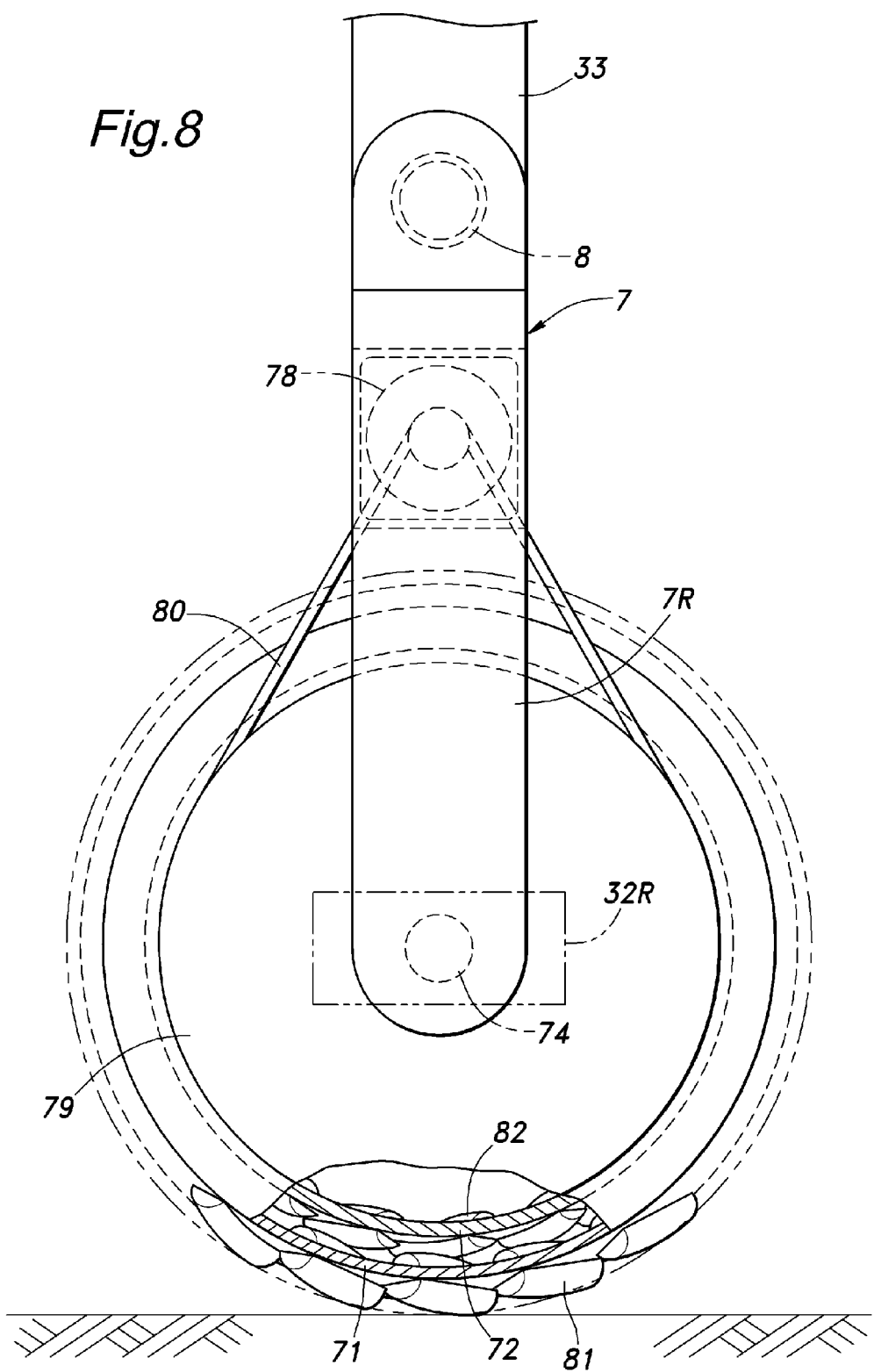
FIG. 8 is an enlarged side view of the friction drive device and omni-directional vehicle using the same of the third embodiment.

A third embodiment of the friction drive device and the omni-directional vehicle using the same of the present invention are described in the following with reference to FIGS. 7 and 8. In FIGS. 7 and 8, the parts corresponding to those in FIGS. 1 and 2 are denoted with like numerals without repeating the description of such parts.

In this embodiment, an outer wheel member 71 (first moveable member) and an inner wheel member 72 (second moveable member) are supported by a left member 7L and a right member 7R of a lower vehicle body 7 via support shafts 73 and 74, respectively, so as to be coaxially rotatable around a central axial line (A).

An electric motor 75 is mounted on the left member 7L of the lower vehicle body 7, and a pulley (or a sprocket) 76 is coaxially formed in the outer wheel member 71. The output end of the electric motor 75 is drivingly coupled with the pulley 76 via an endless belt (or link chain) 77 so as to rotatably actuate the outer wheel member 71 around the central axial line (A) of the support shaft 73.

Another electric motor 78 is mounted on the right member 7R of the lower vehicle body 7, and a pulley (or a sprocket) 79 is coaxially formed in the inner wheel member 72. The output end of the electric motor 78 is drivingly coupled with the pulley 79 via an endless belt (or link chain) 80 so as to rotatably actuate the inner wheel member 72 around the central axial line (A) of the support shaft 74.

The outer wheel member 71 is provided with a frusto-conical shape, and includes a frusto-conical wall (tapered outer periphery) that supports a plurality of barrel-shaped first free rollers 81 arranged circumferentially (in the direction of movement of the outer wheel member 71) thereon at a regular interval. Each first free roller 81 is rotatably supported by the outer wheel member 71 around a central axial line which is neither parallel to or perpendicular to the central axial line of the outer wheel member 71. In this embodiment, the central axial line of each first free roller 81 tilts by 45 degrees with respect to the direction of movement of the outer wheel member 71 on the corresponding tangential surface of the outer wheel member 71 at which the particular first free roller 81 is located.

The inner wheel member 72 is provided with a frusto-conical shape similarly as the outer wheel member 71, and includes a frusto-conical wall (tapered outer periphery) that supports a plurality of barrel-shaped second free rollers 82 arranged circumferentially thereon at a regular interval. Each second free roller 82 contacts the corresponding first free roller 81, and is disposed rotatable around an axial line extending in a skewed relationship to the central axial line of the corresponding first free roller 81.

In other words, the central axial line of each second free roller 82 tilts by a 90 degree angle with respect to the central axial line of the corresponding first free roller 81 on a tangential surface (projected plane) of the outer circumferential surfaces of the outer wheel member 71 and inner wheel member 72 at the point corresponding to the particular first free roller 81.

In this embodiment, the spring force of the compression coil spring 8 resiliently urges the left member 7L and right member 7 toward each other so that a highly intimate contact is achieved between each corresponding pair of the first free rollers 81 and second free rollers 82. Thereby, the second free rollers 82 engage the first free rollers 81 in a torque transmitting relationship.

In this embodiment, when the outer wheel member 71 and inner wheel member 72 are rotated by the corresponding electric motors 75 and 76 in the same direction at the same speed, as there is no relative rotation between the outer wheel member 71 and inner wheel member 72, the first free rollers 81 and second free rollers 82 do not rotate around their respective central axial lines, and the outer wheel member 71 and inner wheel member 72 simply rotate jointly around the central axial line thereof.

When the outer wheel member 71 is kept stationary, and only the inner wheel 72 is turned, the second free rollers 82 rotate around their respective axial lines, and so do the first free rollers 81 engaged by the second free rollers 82.

In this manner, by individually controlling the rotational speeds and rotational directions of the inner wheel member 71 and outer wheel member 72 via the two electric motors 75 and 78, the omni-directional vehicle 1 can be propelled on the road surface in any desired direction.

In this embodiment, whereas each second free roller 82 is made of metallic or hard plastic material, the outer peripheral part of each first free roller 81 defining the outer circumferential surface thereof is made of elastomeric material such as urethane rubber and other rubber-like polymers. In other words, each second free roller 82 is stiffer than the outer peripheral part of each first free roller 81 defining the outer circumferential surface thereof.

Thus, each second free roller 82 engages the corresponding first free roller 81 at the outer circumferential surfaces thereof in such a manner that the outer peripheral part of the first free roller 81 undergoes an elastic deformation by being engaged by the outer peripheral part of the second free roller 82 which is stiffer than the former at the area of mutual contact, and the engagement between the two sets of rollers is effected over a large contact area.

Thereby, the efficiency of the frictional power transmission between the two sets of rollers is improved on account of the reduced slippage between them so that the main wheel 2 is enabled to move as designed, and the power loss can be minimized. Thus, the omni-directional vehicle 1 is enabled to travel in a desired direction in an economical manner.

Figure 9:
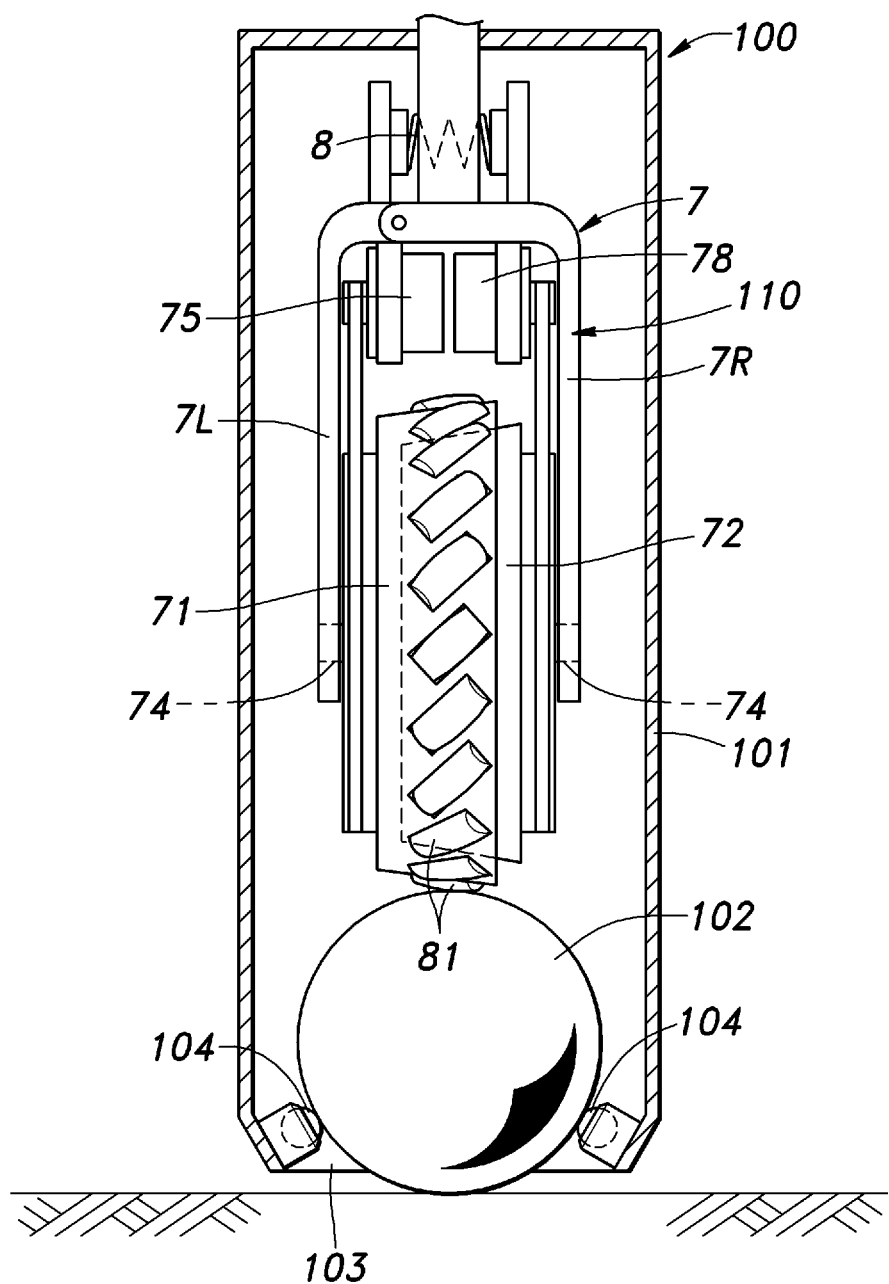
FIG. 9 is an enlarged front view of the friction drive device and omni-directional vehicle using the same of a fourth embodiment of the present invention.

A fourth embodiment of the friction drive device and the omni-directional vehicle using the same of the present invention are described in the following with reference to FIG. 9. In FIG. 9, the parts corresponding to those in FIGS. 7 and 8 are denoted with like numerals without repeating the description of such parts.

The omni-directional vehicle 100 of this embodiment includes a vehicle body 101 formed as a box having an open bottom end, a propelling ball 102 received in the vehicle body 101 so as to be enabled to roll in any direction, and a friction drive device 110. The lower part of the propelling ball 102 is exposed from the lower opening 103 of the vehicle body 101, and engages a floor surface or road surface by rolling over the surface. The propelling ball 101 is retained in the vehicle body 101 so as not to be dislodged downward by being engaged by a plurality of support balls 104 arranged rotatably along the periphery of the lower opening 103 of the vehicle body 101.

The friction drive device 110 includes an outer wheel member 71, an inner wheel member 72, first free rollers 81 and second free rollers 82 in a similar fashion as the friction drive device of the third embodiment, and the first free rollers 81 engage the outer surface of the propelling ball 102 in a torque transmitting relationship.

Thus, the propelling ball 102 is driven into a rolling movement by the friction drive device 110 so that the vehicle body 101 can travel in any desired direction.

A fifth embodiment of the friction drive device and the omni-directional vehicle using the same of the present invention are described in the following with reference to FIGS. 10 to 13.

The omni-directional vehicle 100 of this embodiment includes a vehicle body 101 formed as a box having an open bottom end, a propelling ball 102 received in the vehicle body 101 so as to be enabled to roll in any direction, and a friction drive device 120.

The friction drive device 120 is received in the vehicle body 101, and is placed atop the propelling ball 102. The friction drive device 120 includes a first base frame 121 and a second base frame 122. The second base frame 122 fixedly depends from an upper member 105 of the vehicle body 101.

The first base frame 121 is provided with a first crawler drive device 130, and the second base frame 122 is provided with a second crawler drive device 140.

Figure 10:
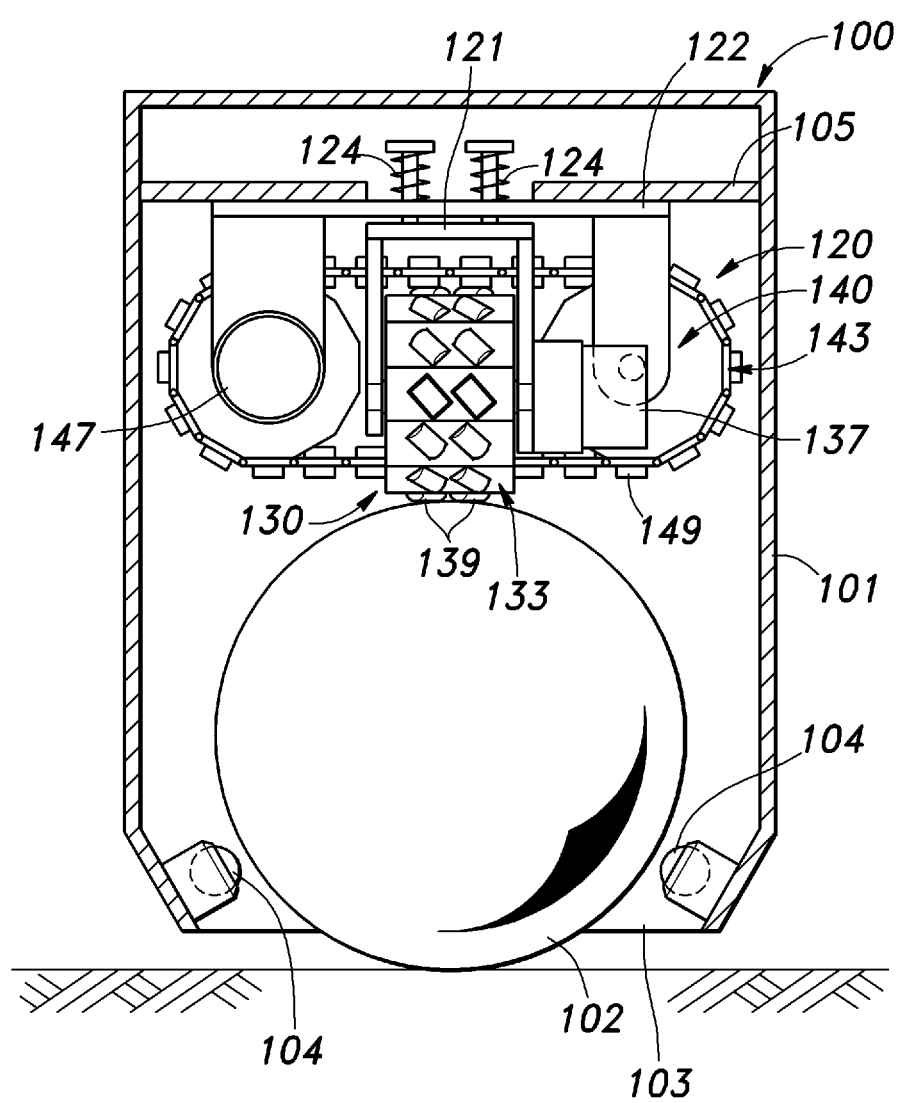
FIG. 10 is a front view of a friction drive device and an omni-directional vehicle using the same as given as a third embodiment of a fifth embodiment of the present invention.
Figure 11:
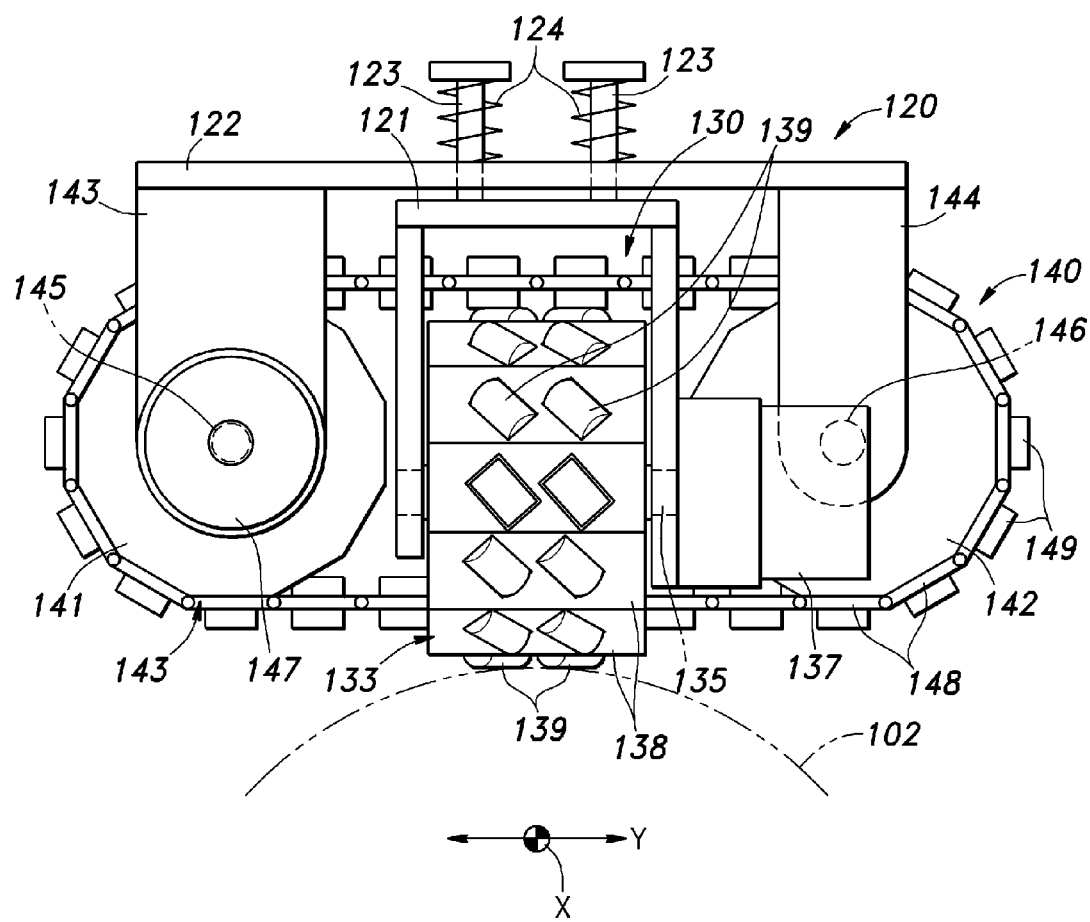
FIG. 11 is an enlarged front view of the friction drive device and omni-directional vehicle using the same of the fifth embodiment.
Figure 12:
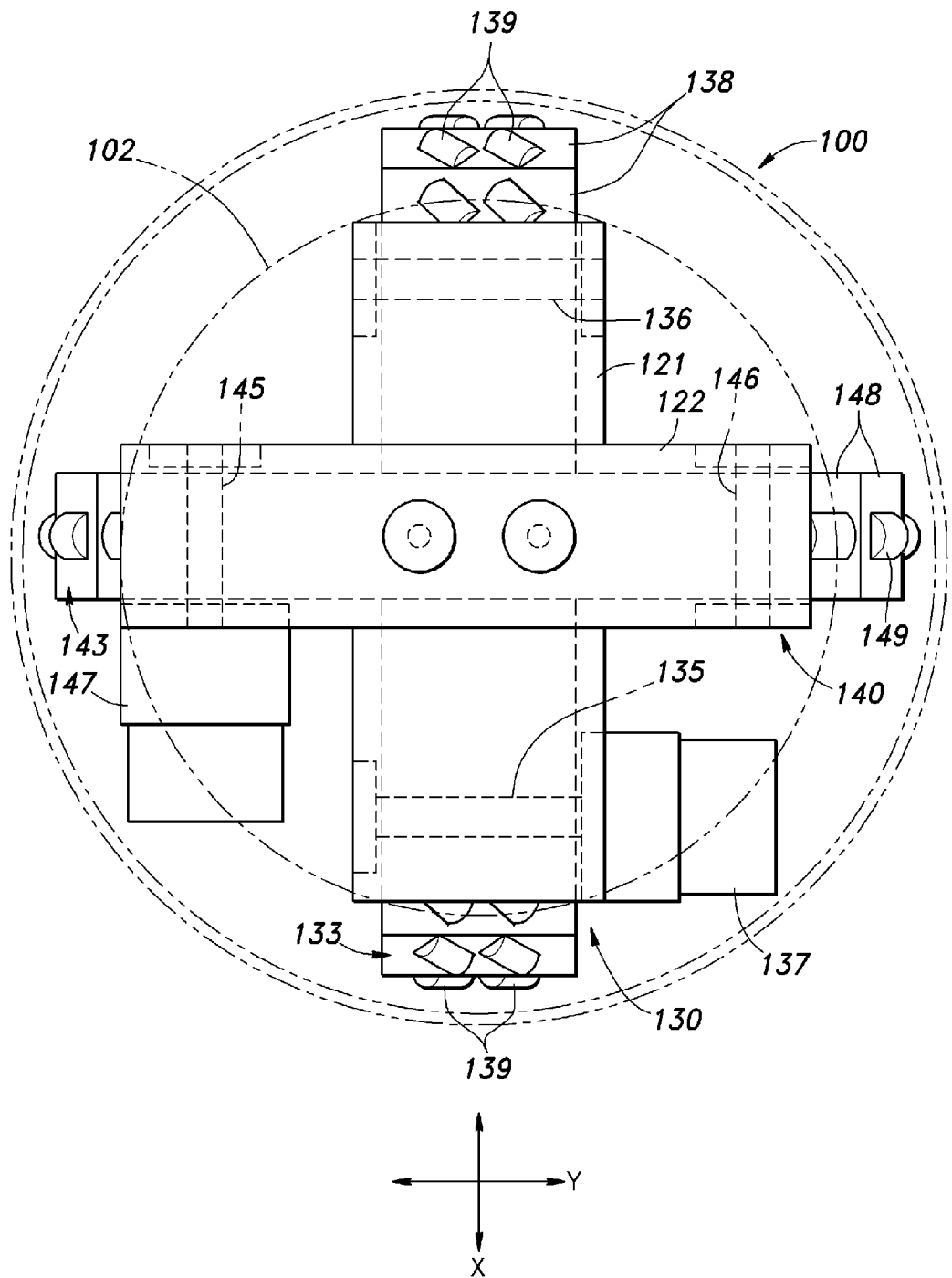
FIG. 12 is an enlarged plan view of the friction drive device and omni-directional vehicle using the same of the fifth embodiment.
Figure 13:
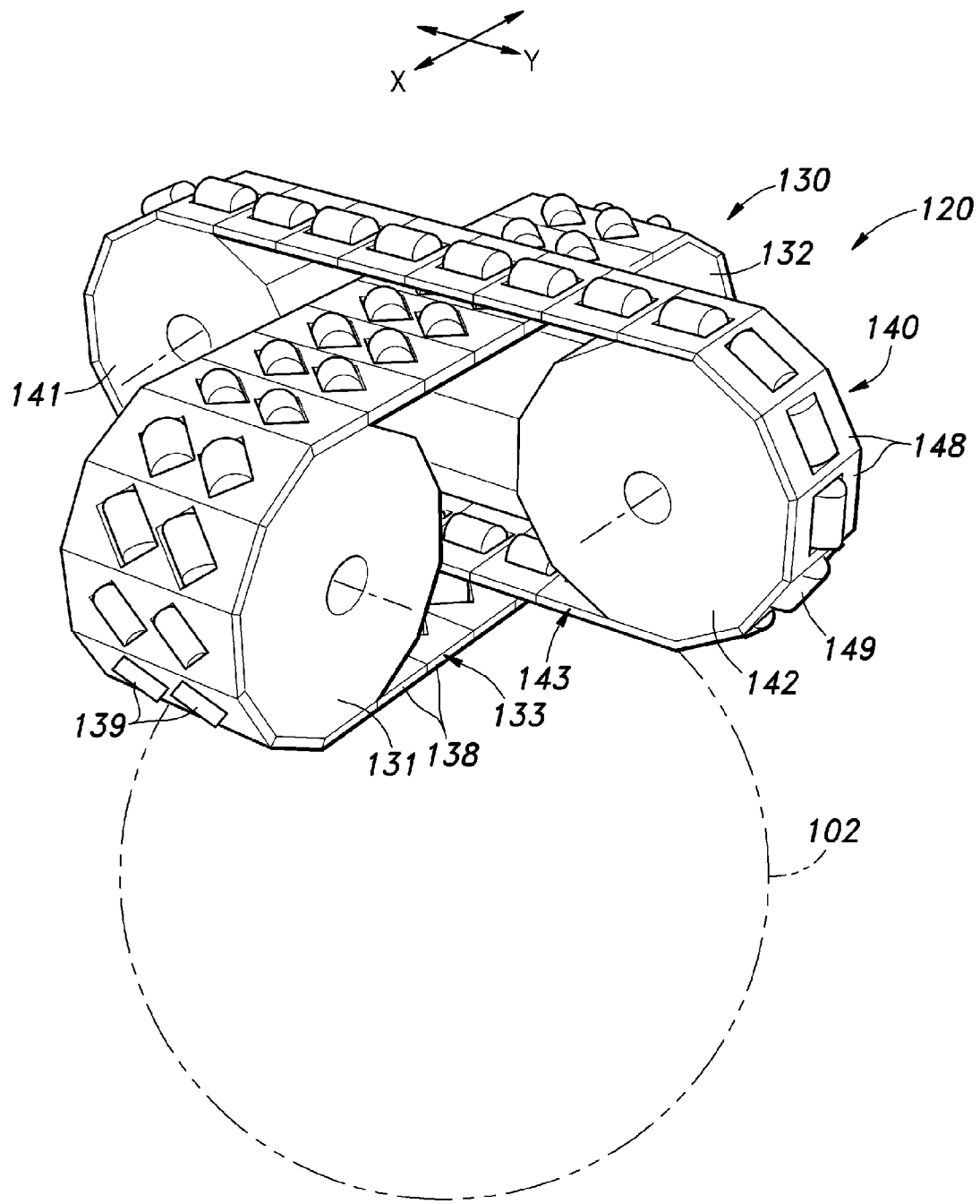
FIG. 13 is a perspective view of the friction drive device and omni-directional vehicle using the same of the fifth embodiment.

The first crawler drive device 130 includes a drive wheel 131 and a driven wheel 132 that are rotatably supported by the first base frame 121 in a mutually spaced apart relationship in the direction perpendicular to the paper of FIGS. 10 to 12 (in the X-direction), and a first crawler belt (first moveable member in the form of an endless belt) 133 passed around the drive wheel 131 and driven wheel 132. The first crawler belt 133 is formed by a plurality of slat pieces 138 that are hinged to each other so as to form an endless belt.

The drive wheel 131 and driven wheel 132 are rotatably supported by the first base frame 121 via respective brackets 133 and 134 and support shafts 135 and 136. One of the brackets 133 corresponding to the drive wheel 131 is provided with an electric motor 137 for actuating the drive wheel 131.

Similarly, the second crawler drive device 140 includes a drive wheel 141 and a driven wheel 142 that are rotatably supported by the second base frame 122 in a mutually spaced apart relationship in the lateral direction as seen FIGS. 10 to 12 (in the Y-direction), and a second crawler belt (second moveable member in the form of an endless belt) 143 passed around the drive wheel 141 and driven wheel 142. The second crawler belt 143 is formed by a plurality of slat pieces 148 that are hinged to each other so as to form an endless belt.

The drive wheel 141 and driven wheel 142 are rotatably supported by the second base frame 122 via respective brackets 143 and 144 and support shafts 145 and 146. One of the brackets 143 corresponding to the drive wheel 141 is provided with an electric motor 147 for actuating the drive wheel 141.

The first crawler belt 133 and second crawler belt 143 extend in mutually perpendicular directions as seen in plan view, and the parts of these crawler belts located between the drive wheels and driven wheels are passed one upon the other.

Each slat piece 138 of the first crawler belt 133 is provided with a pair of cylindrical first free rollers 139 disposed in parallel to each other in a freely rotatable manner. The first free rollers 139 are configured to engage an object to be driven or the spherical surface of the propelling ball 102, and are rotatable around central axial lines that are not perpendicular to the direction of movement of the first crawler belt 133 (X-direction).

The non-perpendicular direction as used herein means that the central axial line of each first free roller 139 extends in a direction other than the direction perpendicular to the direction of movement of the first crawler belt 138, or extends obliquely or in parallel with respect to the direction of movement of the first crawler belt 138. In the illustrated embodiment, the central axial line each first free roller 139 extends at an angle of 45 degrees with respect to the direction of movement of the first crawler belt 138 as projected on the X-Y imaginary plane.

Each slat piece 148 of the second crawler belt 143 is provided with a pair of cylindrical second free rollers 149 disposed in parallel to each other in a freely rotatable manner. The second free rollers 149 are configured to engage the outer surfaces of the corresponding first free rollers 139 in a torque transmitting relationship in the part where the first and second crawler belts 133 and 143 cross each other between the drive wheels and driven wheels. In particular, the central axial line of each second free roller 149 is in a skewed relationship to the central axial line of the first free roller 139 engaged by the particular second free roller 149. The skewed relationship as used herein means that the two axial lines are neither parallel to each other or cross each other, or in other words are not located on a common plane.

More specifically, the central axial line of each second free roller 149 is at an angle of 45 degrees with respect to the corresponding first free roller 139 on the projected X-Y plane. In other words, if suffices if the central axial line of each second free roller 149 is not in parallel (or in a skewed relationship) with the central axial line of the corresponding first free roller 139, and is not perpendicular to the direction of movement of the first crawler belt 133 (Y-direction).

The first base frame 121 and second base frame 122 extend perpendicular to each other to allow the drive wheel and driven wheels to be arranged such that the first crawler belt 133 and second crawler belt 143 may extend perpendicularly to each other. The first base frame 121 is connected to the second base frame 122 via a pair of connecting rods 123 so as to be vertically moveable relative to the second base frame 122.

Each connecting rod 123 is fitted with a compression coil spring 124 that urges the first base frame 121 upward with respect to the second base frame 122. Thereby, in the part where the first crawler belt 133 and second crawler belt 143 cross each other, the outer circumferential surface of each second free roller 149 is made to contact the outer circumferential surface of the corresponding first free roller 139 with a pressure greater than a prescribed value or a pressure adequate for frictionally transmitting movement (torque) between the two rollers at all times.

In this omni-directional vehicle 1, when only the second crawler belt 143 is actuated by the corresponding electric motor 147 while the first crawler belt 133 is kept stationary, the second free rollers 149 on the second crawler belt 143 move along with the second crawler belt 143.

As the first free rollers 139 engage the outer circumferential surfaces of the second free rollers 149 with the central axial lines crossing each other at the 45 degree angle (or in a skewed relationship), the movement of each second free roller 149 caused by the movement of the second crawler belt 143 creates a thrust force directed in the axial direction of the second free roller 149 which in turn causes the rotation of the corresponding first free roller 139 around the central axial line thereof.

The rotation of each first free roller 139 around the central axial line thereof actuates the propelling ball 102 in the corresponding direction.

Furthermore, as the first crawler belt 133 is actuated by the corresponding electric motor 137, the first free rollers 139 moves along with the first crawler belt 133. As a result, the propelling ball 102 is caused to roll in a direction determined by the combination of the rotation of each first free roller 139 and the movement of the first free rollers in the direction of movement of the first crawler belt 133.

By thus controlling the directions of movements and peripheral speeds (ratio) of the first and second crawler belts 133 and 143, the propelling ball 102 may be rolled in any desired direction, and hence the omni-directional vehicle 100 may be propelled in any desired direction.

In this embodiment also, whereas each second free roller 149 is made of metallic or hard plastic material, the peripheral part of each first free roller 139 defining the outer circumferential surface thereof is made of rubber-like elastomer such as urethane rubber or other elastomeric material. Therefore, the second free roller 149 is stiffer than the peripheral part of the first free roller 139 defining the outer circumferential surface thereof.

Therefore, in the area where the outer circumferential surfaces of the first free rollers 139 and second free rollers 149 contact each other, each second free roller 149 having a relatively high stiffness causes an elastic deformation of the peripheral part of the corresponding first free roller 139 having a relatively low stiffness so that the contact surface area between the outer circumferential surfaces of the first free rollers 139 and second free rollers 149 is increased.

Therefore, in this embodiment also, the friction transmission of the rotative force can be effected at a high efficiency, and the slippage between the first free rollers 139 and second free rollers 149 is minimized so that the propelling ball 102 may be actuated as designed, and the power loss can be minimized. Thus, the omni-directional vehicle 1 is enabled to travel in a desired direction in an economical manner.

The difference in the stiffness between the two sets of rollers that engage each other can be achieved not only by the difference in the Young's modulus or stiffness between the materials of the peripheral parts of the two sets of rollers but also by the difference in the cross sectional shapes of the peripheral parts of the two sets of rollers, supporting structures and/or structures of the peripheral parts of the two sets of rollers.

Although the present invention has been described in terms of preferred embodiments thereof, it is obvious to a person skilled in the art that various alterations and modifications are possible without departing from the scope of the present invention which is set forth in the appended claims. The contents of the original Japanese patent application on which the Paris Convention priority claim is made for the present application are incorporated in this application by reference.

GLOSSARY 1 omni-directional vehicle
2 main wheel
3R right drive roller
3L left drive roller
4L, 4R rotatable member
7 lower vehicle body
15 groove
17 cylindrical projection
22 annular member
25 driven roller
51, 52 rotatable member
63 drive roller
71 outer wheel member
72 inner wheel member
81 first free roller
82 second free roller
102 traveling ball
130 first crawlier drive device
133 first crawlier
139 first free roller
140 second crawlier drive device
143 second crawlier
149 second free roller

The invention claimed is:

1. A friction drive device, comprising:
a base frame;
a first moveable member and a second moveable member each moveably supported by the base frame;
a set of a plurality of first free rollers arranged on the first moveable member along a direction of movement of the first moveable member so as to be individually rotatable around a central axial line thereof; and
a set of a plurality of second free rollers arranged on the second moveable member along a direction of movement of the second moveable member so as to be individually rotatable around a central axial line thereof;
wherein each first free roller engages a corresponding one of the second free rollers at outer circumferential surfaces thereof with the central axial lines thereof in a non-parallel relationship as at least one of the first and second moveable members move so as to frictionally transmit power from the second free rollers to the first free rollers, characterized by that:
an outer peripheral part of each first free roller defining an outer circumferential surface thereof has a different stiffness from that of an outer peripheral part of each second free roller defining an outer circumferential surface thereof.

2. The friction drive device according to claim 1, wherein the outer circumferential surface of each free roller of at least one of the two sets of first and second free rollers having a higher stiffness is formed as an irregular surface.

3. The friction drive device according to claim 1, wherein the outer peripheral part of each free roller of one of the two sets of first and second free rollers having a lower stiffness is made of rubber-like elastomeric material.

4. The friction drive device according to claim 1, wherein the central axial line of each first free roller is in a skewed relationship with the central axial line of the second free roller engaged by the particular first free roller.

5. The friction drive device according to claim 1, wherein the first moveable member comprises a main wheel including an annular member configured to be rotatable around a central axial line thereof, and the second moveable member comprises a rotatable member configured to be rotatable around a central axial line thereof, the first free rollers being fitted on the annular member each rotatable around the central axial line thereof, the second free rollers being arranged on the rotatable member around the central axial line thereof.

6. The friction drive device according to claim 1, wherein the first and second moveable members comprise a first endless belt and a second endless belt, respectively, each passed around a pair of rollers at an angle with respect to the other endless belt, and the first free rollers and second free rollers are provided on the first and second endless belts, respectively.

7. The friction drive device according to claim 1, wherein the first and second moveable members comprise a first annular member and a second annular member, respectively, having a common central rotational axial line, and the first free rollers and second free rollers are provided on the first and second annular members, respectively.

8. An omni-directional vehicle including the friction drive device according to claim 1, wherein the vehicle is configured to travel by the first free rollers engaging a road or floor surface.

9. An omni-directional vehicle including the friction drive device according to claim 1, wherein the vehicle further comprises a rollable ball that is actuated by the first free rollers, and is configured to travel by the ball engaging a road or floor surface.

\* \* \* \* \*